United States Patent Office 3,393,605
Patented July 23, 1968

3,393,605
EXPLOSIVELY ACTUATED DEVICE FOR HIGH
PRESSURE ENVIRONMENT
Paul E. Parnell, 3215 Boundary St.,
San Diego, Calif. 92104
Filed Aug. 31, 1967, Ser. No. 665,683
11 Claims. (Cl. 89—1)

ABSTRACT OF THE DISCLOSURE

This disclosure concerns an explosively actuated piston and piston rod arrangement for use in extremely high pressure environments such as may be encountered in deep submergence oceanography explorations in which the piston rod is also the stem of a valve and a portion of the body assembly of the device is formed as a valve seat. The valve is resiliently supported and so designed as to withstand high external pressures and at the same time maintain an air cavity ahead of the piston and behind the valve which allows the piston to move forward without significant interference of the extreme high pressure environment external to the device. Accordingly, maximum explosive thrust is transmitted through the chamber wall by the valve stem.

The invention described herein may be manufactured and used by or for the Government of the United States of America for governmental purposes without the payment of any royalties thereon or therefor.

Background of the invention

The increasing emphasis and importance placed on deep submergence explorations and operations, and the everbroadening extent of oceanography studies for both peaceful and military purposes and objectives led to the need for devices which may be remotely actuated and which will perform with an acceptable degree of efficiency in the extremely high pressure environment of such deep submergence work. Moreover, such devices are preferably required to be of a reusable type rather than a self-destructive type; it is also highly desirable that in employing an explosively actuated device, the explosively generated actuating gases not be allowed to abruptly or suddenly escape into the surrounding environment to cause disruptive and obviously undesirable effects.

In the prior art, a number of explosively actuated devices have been developed, some of which are designed especially for use at depths up to several hundred feet, i.e. maximum diver operation depths. Some of the prior art devices have been effective at these lesser depths but also had the detracting feature of being self-destructive and therefore not capable of recharging for reuse. Other prior art devices have been so designed and conceived as to release high pressure gasses into the surrounding water or other high pressure environment so as to cause sudden shock waves and other undesired effects.

Summary of the invention

The present invention comprises an explosively actuated device for use in high pressure environments and includes a body assembly having a chamber which is configured to receive and support an explosive charge therein. The explosive charge may be connected to be electrically actuated in a manner well known in the explosive art. Appropriate sealing means may be provided and seated on the flange of a threaded explosive charge chamber so as to secure the chamber portion to a body assembly.

The body assembly preferably includes a cylindrical cavity which communicates with the explosive charge chamber. A piston is fitted to and supported within the cylindrical cavity for movement along the axis of the cylindrical cavity. In its preferred embodiment, the present invention may also include an appropriate sealing means such as an O ring peripherally fitted about the piston to perfect the seal between the piston and the cylindrical cavity in which it is supported.

A valve member is also supported within the body assembly and is seated against a valve seat portion which is suitably formed in the body assembly. The valve member has a valve stem portion which also is operative in the manner of a piston rod and is held in resilient contact with the piston by an appropriate resilient means positioned and supported within the body assembly. The resilient means performs the second and equally important function of holding the valve member in pressure contact with the valve seat portion so as to exclude the external high pressure environment such as might be encountered in deep submergence oceanography work. Accordingly, the valve member is responsive to displacement of the piston along the axis of the cylindrical cavity. The resilient means is also operative to urge the valve member against the piston in its rest position for forming a void portion within the cylindrical cavity on the opposite side of the piston relative to the explosive charge.

In its preferred embodiment, the present invention also includes an enlarged portion of the cylindrical cavity positioned within the void area or portion normally formed within the cylindrical cavity when the resilient means urges the valve member against the piston in its unfired or rest state. In accordance with the concept of the present invention, the valve member is employed so that a minimum cross-sectional area is exposed to the high pressure environment. Accordingly, when the explosive charge is fired and its force is transmitted through the piston and the valve member, a minimum cross-sectional area is exposed to offer any resistance to the external actuation of the device. Thus, the device is highly efficient in that the explosive power which is employed for its actuation is not substantially dissipated in opposing the high pressure external environment in which it is used.

Moreover, in accordance with the concept of the present invention, the enlarged portion of the cylindrical cavity is so disposed and positioned relative to the co-acting members of the device, that the explosive pressures generated by firing of the explosive charge are allowed to be released in a controlled manner by passage through the enlarged portion of the cylindrical cavity; from there they escape in a relatively slow fashion to the high pressure external environment by passing around the valve stem or piston rod portion of the device, the valve member having been displaced from its normally seated and sealed position by the displacement of the piston member with which it coacts in response to its movement. Furthermore, in accordance with the concept of the present invention, the valve and valve seat of the assembly are so positioned that the external high pressure environment operates to force the valve into high pressure sealed contact with the seat thus excluding the water or such other high pressure medium from reaching the interior of the device.

Accordingly, it is a primary object of the present invention to provide an explosively actuated device for use in a high pressure environment which operates with significantly increased efficiency.

Yet another important object of the present invention is to provide such an explosively actuated device which is readily adapted to be reusable.

A further most important object of the present invention is to provide such an explosively actuated device in which the internally generated explosive gasses are permitted to escape to the surrounding high pressure medium in a controlled fashion so as not to create shock waves or other unwanted disturbances.

A further object of the present invention is to provide an explosively actuated device of the type described wherein the external high pressure environment is prevented from reaching the interior of the device by a valve and valve seat arrangement which is urged into a high pressure sealed contact by the external high pressure environment.

Yet a further object of the present invention is to provide such an explosively actuated device including piston and valve stem members having sealing means peripherally disposed thereabout and cooperatively functioning together with respective portions of the body assembly which are configured to release explosive gas pressures generated at such respective sealing means.

These and other features, advantages, and objects of the present invention will be more fully appreciated from an understanding of a preferred embodiment of the present invention as illustrated in the accompanying drawing and the descriptive text explaining the coaction and operation of its several elements.

*Description of the preferred embodiment*

Figure 1:
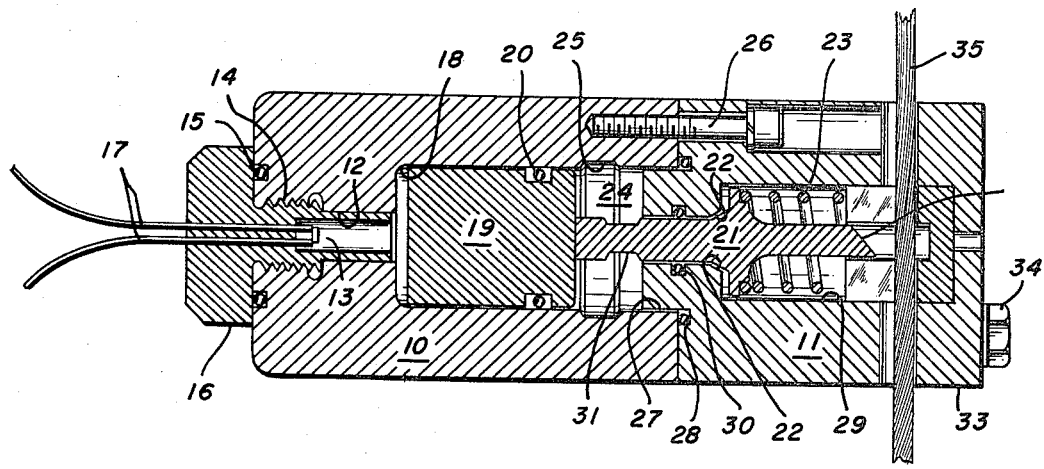
FIG. 1 is a cross-sectional view of an embodiment of the present invention comprising a cable cutter.

FIG. 1 is a cross-sectional illustration of a preferred embodiment of the present invention as may be employed for cable cutting purposes. The illustration of FIG. 1 shows an embodiment of the present invention in its loaded and unfired condition. The illustrated embodiment comprises a body assembly which, in the particular device shown, consists of two parts including an upper portion 10, and a lower portion 11. The body assembly has a chamber 12 in its upper portion 10 which is configured to receive and support an explosive charge such as that shown at 13. The explosive charge 13 may be formed with suitable means such as the threads 14 for removably securing the explosive charge assembly in sealed pressure contact with the body assembly 10 as by the O ring 15 shown under the flange 16 of the explosive charge assembly. The explosive charge 13 may be arranged to be fired under electrical control as afforded by the two electrical connections 17. The electrical connections as shown at 17 may be connected to a remote point so that the device of the present invention may be controlled and actuated from any desired distant position.

Within the body assembly 10, a cylindrical cavity 18 is formed which communicates with the explosive charge 13 previously described. A piston 19 is fitted and supported within the cylindrical cavity 18 substantially in a position as illustrated when the device is in its normal unfired condition. The piston 19 may include an appropriate sealing means such as the O ring 20 positioned in an appropriate recess in the piston 19 under pressure contact against the side walls of the cylindrical cavity 18.

A valve member 21 is arranged to be seated against a valve seat portion 22 of the lower portion of the body assembly 11. A suitable resilient means, such as the spring 23, is positioned and supported for holding the valve member in pressure contact with the valve seat and aligned with the piston so that the valve member will be responsive to displacement of the piston along the axis of the cylindrical cavity 18. A second function performed by the resilient means 23 is to urge the valve member 21 against the piston 19 for positioning the piston 19 toward the explosive charge 13, forming a void portion 24 within the cylindrical cavity 18. It will be noted that the void portion 24 of the cylindrical cavity 18 includes an enlarged annular section as shown at 25.

In its assembled unfired condition, the device of the present invention has the lower portion 11 of the body assembly secured to the upper portion 10 of the body assembly by a plurality of appropriate securing means such as the bolt shown at 26. The lower portion 11 of the body assembly may be securely sealed to the upper portion 10 of the body assembly by pressure of bolts such as that shown in 26, together with a tightly fitting collar configuration as shown at 27 and an O ring 28 recessed within the lower portion 11 of the body assembly and urged in tight pressure contact against the upper portion 10 of the body assembly. Accordingly, the assembled device of the present invention excludes the fluid of the high pressure external environment, such as water, from reaching its interior.

The high pressure external environment is allowed to reach within the cavity 29 of the lower portion 11 of the body assembly, but it is excluded from the interior of the device, and more particularly the air cavity 24, by reason of the valve 21 being resiliently held against the valve seat 22. In a preferred embodiment of the present invention, the valve may also be further secured against the seepage of the high pressure external environment by a suitable O ring 30 positioned in a recess in the lower portion 11 of the body assembly so as to surround the stem of the valve member 21, sealing it in pressure contact against the external high pressure environment.

In a preferred embodiment of the present invention the valve member 21 may have a portion of the valve stem which is narrower than the remainder as shown at 31. The narrow portion 31 of the valve member 21 is so configured and positioned relative to the remainder of the assembly of the device of the present invention to perform a particular function which will be explained more fully hereinafter.

As shown in the illustration of FIG. 1, the externally exposed portion of the valve member 21 is employed to effect the desired actuation upon firing of the explosively actuated device. In the particular embodiment illustrated, the lower portion of the valve member 21 is formed to have a cutting edge as shown at 32. The embodiment illustrated also includes an anvil portion 33 which is bolted securely to the lower portion 11 of the body assembly by a plurality of bolts such as the bolt shown at 34. Accordingly, a cable 35 may be positioned approximately within the anvil 33 so as to be readily severed by the cutter portion 32 of the valve member 21 upon actuation of the device from a remote point as desired.

*Operation*

Figure 2:
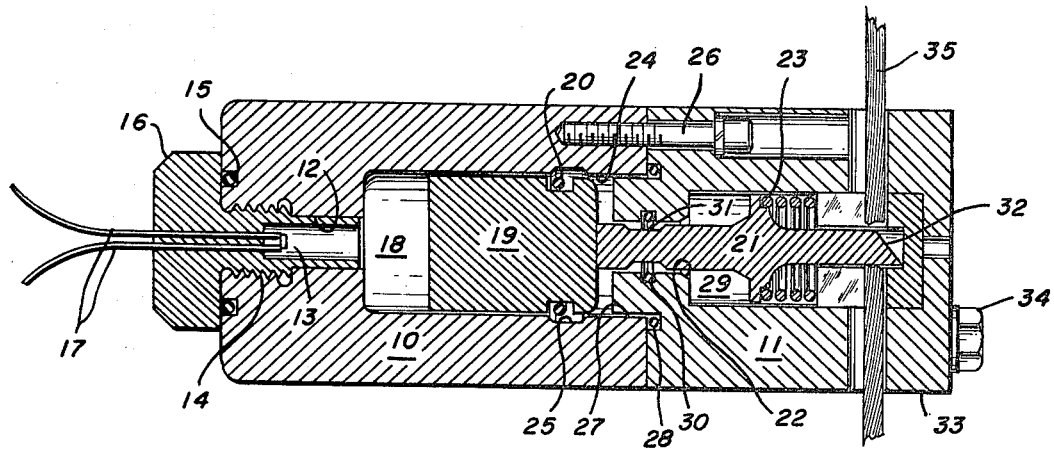
FIG. 2 is a cross-sectional view of the embodiment of FIG. 1 after it has been actuated by firing of the explosive charge.

The operation of the explosively actuated device of the present invention may be appreciated from an understanding of the coacting functions of its elements as is illustrated in the unfired normal condition of the cross sectional drawing of FIG. 1 together with the fired fully actuated condition of the device as illustrated by the cross-sectional drawing of FIG. 2.

The elements of the device bear the same numerical designations in FIG. 2 as in FIG. 1. However, as will be more fully understood hereinafter, actuation of the device as, for instance, from a remote point, causes a number of elements of the device to change relative positions and external actuation as desired is effected by the novel coaction of its component elements as will be explained.

The electrical wires 17, leading to the explosive charge 13, are employed to fire the explosive charge 13. Since the explosive charge 13 is contained within a chamber 12 which communicates with the cylindrical cavity 18, the explosively expanding gasses emanating from the explosive charge 13 overcome the spring pressure of the resilient means 23 and force the piston 19 against the valve member 21 driving it sharply to the right as shown in the illustration of FIG. 2. Accordingly, the cutting edge 32 severs the cable 35 which is held in its proper position for that operation by the anvil 33.

One important aspect of the present invention is the fact that the piston 19, which receive the explosive forces of the charge 13, is not exposed to the high pressure external environment in which the device is used. Accordingly, the force of the explosive charge 13 does not have to overcome the full pressure and counterforces of the high pressure environment.

As may be seen from the illustration of the cross section of FIG. 2, it is only the valve member 21 which is driven in the high pressure external environment. In accordance with the concept of the present invention, the valve member 21 has a minimal cross-sectional area consistent with requirements for strength and effective operation. Thus, the amount of high pressure counterforces exerted against the valve member 21 is minimized and virtually all the effective explosive forces exerted by firing of the explosive charge 13 against the piston 19 are transmitted to the valve member 21 and are useful in actuation of the device to effect the desired result, such as cutting the cable 35 shown in this particular illustration of a preferred embodiment.

It should be appreciated that this desired result as achieved by the unique concept of the present invention, is afforded by the arrangement and coaction of its elements in which the piston 19 receives the explosive forces and thrust generated by firing of the explosive charge 13 and operates against an air cavity or void as previously described and shown at 24 in FIG. 1. This operative feature is in contrast to many prior art devices comprising comparable apparatus designed and conceived so that the explosive force of the explosively actuated device was substantially spent in overcoming counterforces of the high pressure environment in which it was designed to operate.

By reference to FIGS. 1 and 2, the functional concept of further features of the present invention may be more readily appreciated. The enlarged portion 25 of the cylindrical cavity 18, which includes the air cavity or void 24, is so configured and positioned that the O ring 20, peripherally fitted and retained about the piston 19, is moved into the enlarged annular portion 25 of the cylindrical cavity 18. Accordingly, the seal between the O ring 20 and the walls of the cylindrical cavity 18 is broken, releasing the explosive pressures for flow in a relatively slow, controlled manner about the piston 19. Coincident with piston 19 being driven forward by the explosive charge 13, the valve member 21 is also driven forward in the manner previously described and illustrated by FIG. 2. As shown in FIG. 2, the narrowed annular portion 31 of the valve member 21 is driven to a position so as to break the seal formed between the O ring 30 and the valve stem portion of the valve member 21, similarly relieving and releasing the pressures built up behind the O ring seal and allowing the explosively generated expanding gasses to escape in a slow and relatively controlled manner to the external pressure environment until such internally generated expanding gasses are entirely equalized relative to the external high pressure environment.

It is important to note that the device of the present invention is so conceived as to be readily reusable by recovery and replacement of the spent explosive charge by a new explosive charge. This is readily and conveniently accomplished by unscrewing the threaded explosive charge assembly. Accordingly, the device of the present invention does not include any frangible elements which rupture and must be replaced. Moreover, the device of the present invention is not self-destructive and consequently may be reused many times.

It is important to appreciate that in the perspective of the prior art and the concepts of superficially comparable devices, the present device has been found to operate efficiently and effectively at pressures up to 15,000 pounds per square inch and more. Thus, the device of the present invention is of a completely different order of operational effectiveness than many devices of related prior arts which are limited to operation at diver depths of up to the order of 200 to 300 feet in an ocean environment, for example.

Additionally, the present invention is so designed and conceived that the high pressure, external environment is caused to exert its own force in addition to the resilient force of the spring means 23 as shown in FIGS. 1 and 2 to more positively seat the valve seat portion of the valve member 21 firmly against the matching valve seat portion 24 of the body assembly member 11.

In accordance with the concept of the present invention, the explosively actuated device includes a valve which is designed to withstand high external pressures and at the same time maintain an air cavity ahead of the piston and behind the valve which allows the piston to move forward without interference of the external pressures so that virtually all the thrust of the explosive actuation is transmitted through the chamber wall to the valve member to effect the desired actuation. The counterforces of high pressure external environment consequently are exerted only against a relatively small area of the valve member, resulting in an unusually high degree of efficiency.

The explosive power generated by reason of firing the explosive charge is contained within the device during the force stroke and the expanding gasses generated explosively are allowed to escape relatively slowly and at a controlled rate at the end of the power stroke so that minimum stock and disturbance is introduced into the surrounding high pressure environment. Thus, it may be appreciated that the device of the present invention provides a means of employing explosive power actuation under extremely high pressure conditions with a high degree of efficiency and without the introduction of undesired shock waves or other disturbances into the surrounding high pressure medium such as water at great depths, for instance. This is a most important feature of the present invention which is highly desirable in tactical situations where operations must be completed at great depths such as in oceanography, for example, with minimal disturbance of the surrounding water.

It should be appreciated by those skilled in the art that the explosively actuated device of the present invention has been illustrated and explained in terms of an embodiment which may be employed as a cable cutter. However, any desired remotely controlled actuation may be achieved by suitable employment of the power stroke generated and transmitted through the device of the present invention in a manner analogous to the cable cutter illustrated and explained herein.

Obviously many modifications and variations of the present invention are possible in the light of the above teachings. It is therefore to be understood that within the scope of the appended claims the invention may be practiced otherwise than as specifically described.

What is claimed is:

1. An explosively actuated device for use in a high pressure environment comprising:

a body assembly having a chamber configured to receive and support an explosive charge therein;

a cylindrical cavity formed in said body assembly and communicating with said chamber;

a piston fitted to and supported within said cylindrical cavity for movement along the axis of said cylindrical cavity;

a valve member seated against a valve seat portion of said body assembly, said valve member having a minimum cross-sectional area exposed to said high pressure environment for effecting external actuation;

resilient means positioned for holding said valve member in pressure contact with said valve seat and aligned with said piston for external actuation of said valve member responsive to displacement of said piston along said axis, said resilient means being operative to urge said valve member against said piston, positioning said piston toward said explosive charge for forming a void portion within said cylindrical cavity on its opposite side relative to said explosive charge; and an enlarged portion of said cylindrical cavity within said void portion.

2. An explosively actuated device as claimed in claim 1 and including sealing means disposed about the periphery of said piston and positioned for relieving the seated pressure upon firing said explosive charge when said piston is displaced along said axis.

3. An explosively actuated device as claimed in claim 2 wherein said sealing means is displaced to said enlarged portion of said cylindrical portion for releasing said sealed pressure.

4. An explosively actuated device as claimed in claim 3 wherein said valve member is resiliently displaced from said valve seat coincidently with the release of said sealed pressure for relieving said pressure to said high pressure environment.

5. An explosively actuated device as claimed in claim 1 wherein said valve member includes actuation means exposed to said high pressure environment.

6. An explosively actuated device as claimed in claim 5 wherein said actuation means comprises a cutting means.

7. An explosively actuated device as claimed in claim 6 and including an anvil portion positioned to coact with said cutting means.

8. An explosively actuated device as claimed in claim 1 wherein said valve member includes a valve stem portion fitted within said body assembly and sealing means peripherally disposed about said valve stem portion.

9. An explosively actuated device as claimed in claim 8 and including a section of said valve stem portion configured and positioned for releasing pressure past said sealing means upon a predetermined displacement of said valve member.

10. An explosively actuated device as claimed in claim 1 wherein said body assembly comprises upper and lower sections removably secured in sealed pressure contact.

11. An explosively actuated device as claimed in claim 1 wherein said body assembly includes an explosive charge chamber assembly removably secured in sealed pressure contact for communication with said cylindrical cavity.

References Cited
UNITED STATES PATENTS

| | | | |
|---|---|---|---|
| 3,024,530 | 3/1962 | Haskell et al. | 30—92 |
| 3,142,219 | 7/1964 | Martin | 83—639 |
| 3,257,724 | 6/1966 | Wilterdink | 30—228 |

SAMUEL W. ENGLE, *Primary Examiner.*